Feb. 16, 1971  L. R. MALKOWSKI ETAL  3,563,876
ELECTROCHEMICAL MACHINING APPARATUS HAVING RAM MEANS
Filed Aug. 27, 1968  2 Sheets-Sheet 1

INVENTORS
Leonard R. Malkowski
Sigmund H. Bielak
BY Dressler, Goldsmith, Clement & Gordon
ATTORNEYS

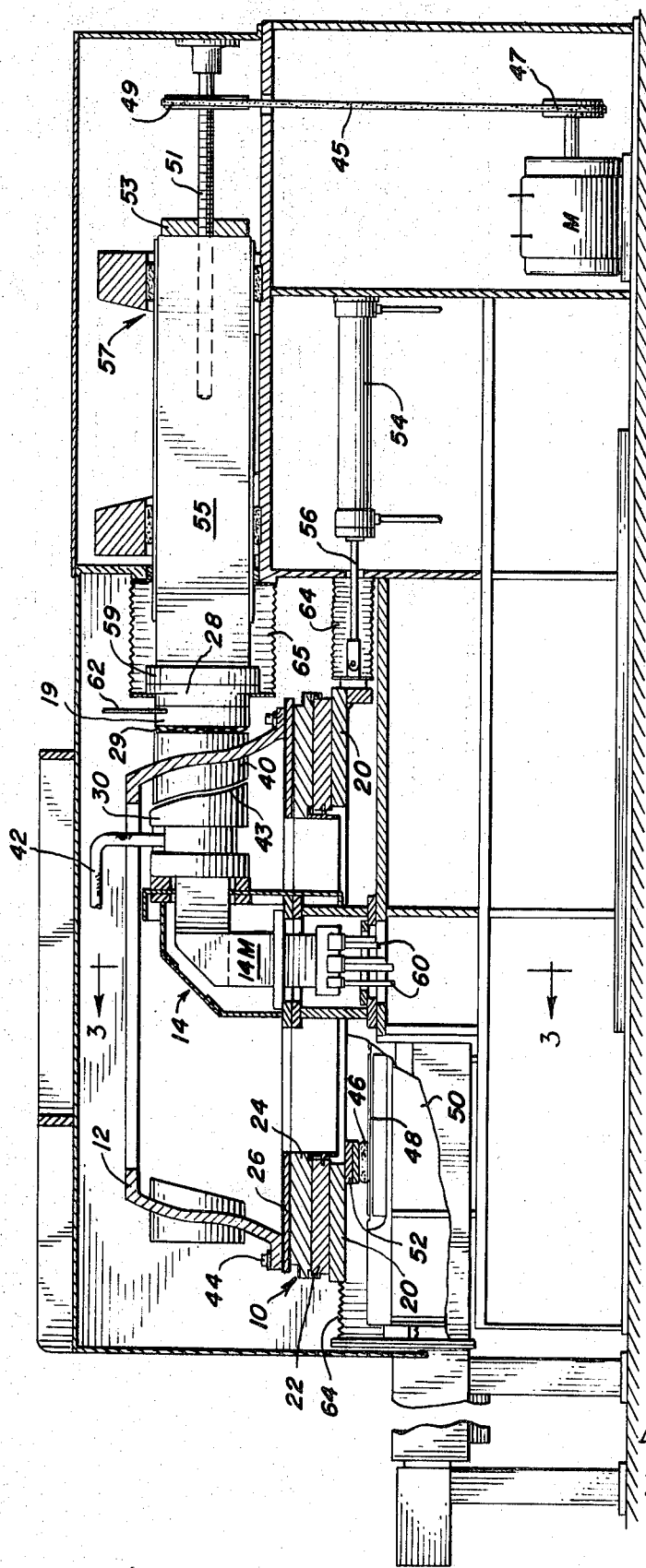

3,563,876
ELECTROCHEMICAL MACHINING APPARATUS
HAVING RAM MEANS
Leonard R. Malkowski, La Grange, and Sigmund H. Bielak, Downers Grove, Ill., assignors to Anocut Engineering Company, a corporation of Illinois
Filed Aug. 27, 1968, Ser. No. 755,561
Int. Cl. C23b 5/68, 1/00; B01k 3/00
U.S. Cl. 204—212            12 Claims

ABSTRACT OF THE DISCLOSURE

An apparatus used in electrochemical machining which comprises a rotatable table for carrying a workpiece, the table being also movable in a horizontal direction. A first electrically conductive member is mounted in a position adjacent the workpiece, the latter being carried on the table. A horizontal ram is provided to carry a second electrically conductive member, which can be moved by the ram into adjacent relation with the first electrically conductive member. The apparatus is typically used by securing a cylindrical or other hollow workpiece to the table with the first electrically conductive member being held in the interior of the hollow workpiece. One of the electrically conductive members is brought into contact with the workpiece. A stream of pressurized liquid is passed between the other conductive member and the workpiece, the conductive members being urged toward each other by the ram, while direct electric current is passed between the members and through the workpiece and stream of electrolyte in a sense to make the workpiece anodic relative to the conductive member separated from it by the stream of electrolyte.

ADVANTAGES OF THE INVENTION

This invention relates to an apparatus for holding and positioning a workpiece and a shaping cathode during electrolytic demetallization processes.

BACKGROUND OF THE INVENTION

The field of electrolytic demetallizing is a rapidly growing and diversified art, a broad description of the field being supplied by U.S. Pat. No. 3,058,895. Basically, an electrode is brought into an adjacent relation with an electrically conductive and electrochemically erodible workpiece, while liquid electrolyte, by any of several known means, is passed under pressure across the gap between the electrode and the workpiece. A common technique for passing the electrolyte across the gap is shown in the above patent, while an alternative technique is shown in U.S. Pat. No. 3,254,013.

Electric current is passed between the electrode and the workpiece through the rapidly moving stream of electrolyte in a sense to make the workpiece anodic. Under these conditions, the workpiece can be smoothly eroded into a large variety of shapes, e.g. turbine blades, dies, and other complex parts.

The apparatus of this invention is particularly useful for electrochemically eroding hollow workpieces which have at least one opening to the exterior. By means of this apparatus, the electrode can be placed inside such a workpiece to demetallize portions of the interior. In addition, the apparatus of this invention can be used to demetallize exterior portions of the same workpiece without removing the workpiece from its mounting in the apparatus of this invention.

The apparatus of this invention can also be used to machine quickly and efficiently several portions of a workpiece which are precisely located with respect to each other, even though the portions are located on both the inside and the outside of the workpiece. This is accomplished through the use of an open center rotating index table on which the workpiece rests. Each portion of the workpiece which is to be machined on a given side of the workpiece (whether the inside or the outside thereof) can be quickly and accurately presented to the shaping cathode simply by rotating the index table until the workpiece reaches the desired position, and then locking the table to prevent further rotational movement. After all desired portions on either the inside or the outside of the workpiece (as the case may be) have been machined, a shaping cathode can be placed at a different location on the machine of this invention, as described below, to machine the areas desired on the opposite side of the workpiece without removing the workpiece from its mounting. This avoids the possibility of disturbing the alignment of the workpiece and creating inaccuracies in the machined product.

The apparatus of this invention can be used to machine cylindrical parts such as those used in aircraft jet engines, which frequently require electrochemical machining operations to produce bosses or air foil shapes of various kinds on both the inside and outside thereof. A large number of machining operations can be quickly performed on a cylindrical workpiece, or on other open, hollow workpieces, using the apparatus of this invention.

SUMMARY OF THE INVENTION

In accordance with this invention, an apparatus for electrochemically machining a conductive metal workpiece is provided which contains a table having a work-supporting surface upon which a workpiece can be held. An elongated member extends through an aperture in the table, and is capable of holding a first electrode member in a position spaced from the workpiece.

The elongated member and the table are capable of relative motion with respect to each other to bring the workpiece and the first electrode member into close proximity with each other. A ram carries a second electrode member and is adapted to move the second electrode member in a direction generally parallel to the direction of relative motion between the table and the elongated member to bring both electrode members into proximate, face-to-face relation with each other, with the workpiece located between the two electrode members.

Typically, the work-supporting table has an indexing table capable of rotating about an axis perpendicular to the work-supporting surface to rotate the workpiece. The apparatus of this invention also has means for connecting a source of direct current across the electrode members, through the workpiece, and in a sense to make the workpiece anodic with respect to one of the electrode members which thus becomes cathodic. Pressurized liquid electrolyte is provided to pass between that one cathodic electrode member and the workpiece while they are in close proximity with each other, to effect electrolytic demetallization.

The two electrode members are pressed together by the action of the ram with the workpiece located between them. The stream of pressurized electrolyte flowing between the one cathodic electrode member and the workpiece separates that member and workpiece by creating a back pressure which tends to drive them apart. This tendency is counteracted by the action of the ram, which can control the width of the electrolyte-filled work gap between the electrode member and workpiece by exertion of a greater or lesser driving force.

The noncathodic electrode member, which is not separated from the workpiece by a stream of pressurized electrolyte, bears against the workpiece in an electrically conductive manner to facilitate the flow of electric current between the two electrode members via the workpiece and the stream of pressurized electrolyte. This arrangement can be used to minimize the distance within the workpiece through which the electric current path must pass, which can result in considerable savings in power when the workpiece is made of a material having poor electrical conductivity.

The means for moving the table and the elongated member with respect to each other is commonly an arrangement for moving the table upon a system of bearings and hardened ways, plus a means for controlling the position of the table, which is often a hydraulic or pneumatic cylinder. With this arrangement, the table can slide back and forth in a direction generally parallel to the direction of motion of the ram, while the elongated member remains fixed.

The means for controlling the position of the table is commonly used to hold the workpiece firmly against the noncathodic electrode member which is not separated from the workpiece by the stream of pressurized electrolyte. This minimizes arcing between the workpiece and the noncathodic electrode member, which arcing takes place upon any momentary separation of the workpiece and the noncathodic electrode member. Such a separation can be caused by buffeting which may arise from turbulence in the stream of pressurized electrolyte.

The ram used in the apparatus of this invention causes the cathodic electrode member to advance toward and into the workpiece against the back pressure of the flowing electrolyte, which pressure can be very substantial in cases where the electrode members and the workpiece are large in surface area. The fact that the ram is used to counteract this back pressure permits the rotary indexing table to be made with precision and without unusually strong reinforcement, since it is not subjected to the heavy forces which are encountered when the cathode is driven into the workpiece. Thus the rotary indexing table can be a highly refined instrument adapted to give a high level of accuracy to the angular orientation of the workpiece during machining.

When it is desired to machine the inside of a workpiece, the first electrode member, mounted on the elongated member extending upwardly through the aperture in the table, is made the shaping cathode. Pressurized electrolyte is provided to pass between the first electrode member and the workpiece. The second electrode member is brought to bear by the ram against the workpiece, and both the second electrode member and the workpiece are driven by the ram against the stream of pressurized electrolyte passing between the first electrode member and the workpiece, while electric current is passed between the two electrode members, across the stream of electrolyte and the workpiece in a sense to make the first electrode member cathodic with respect to the workpiece.

If it is desired to machine the outside of the same workpiece, the workpiece need not be removed from its mounting. The second electrode member becomes the shaping cathode, and pressurized electrolyte is passed between the second electrode member and the workpiece. The relative motion between the table and the elongated member brings the workpiece against the first electrode member in an electrically conductive relationship, while the ram drives the second electrode member toward the workpiece against the back pressure created by the flowing electrolyte. Electrolytic machining takes place as electric current passes between the electrode members in a sense to make the second electrode member cathodic with respect to the workpiece.

Thus, the apparatus of this invention can be used to machine either the inside or outside of a workpiece or both as desired.

DESCRIPTION OF THE DRAWING

FIG. 2 is a sectional view of the apparatus of FIG. 1, taken along line 2—2 in FIG. 1 with the difference that the first electrode member is shown as the shaping cathode.

FIGS. 1 through 3 disclose an apparatus which has a moving table 10, capable of imparting both lateral motion and rotary motion to generally cylindrical workpiece 12, a fragment of which is shown in phantom lines in FIG. 1. Workpiece 12 thus can be rotated to present to the shaping cathode the portion of the workpiece which is to be machined. Elongated member or tooling post 14 extends through aperture 16 in moving table 10, and is adapted to carry an electrode member which is shown in phantom in FIG. 1 as backing electrode 19.

Table 10 contains base 20 on which support ring 22 and rotatable ring 24 are carried. Pads 26 are carried by rotatable ring 24 to define a flat surface to which the workpiece 12 is affixed.

Figure 1:
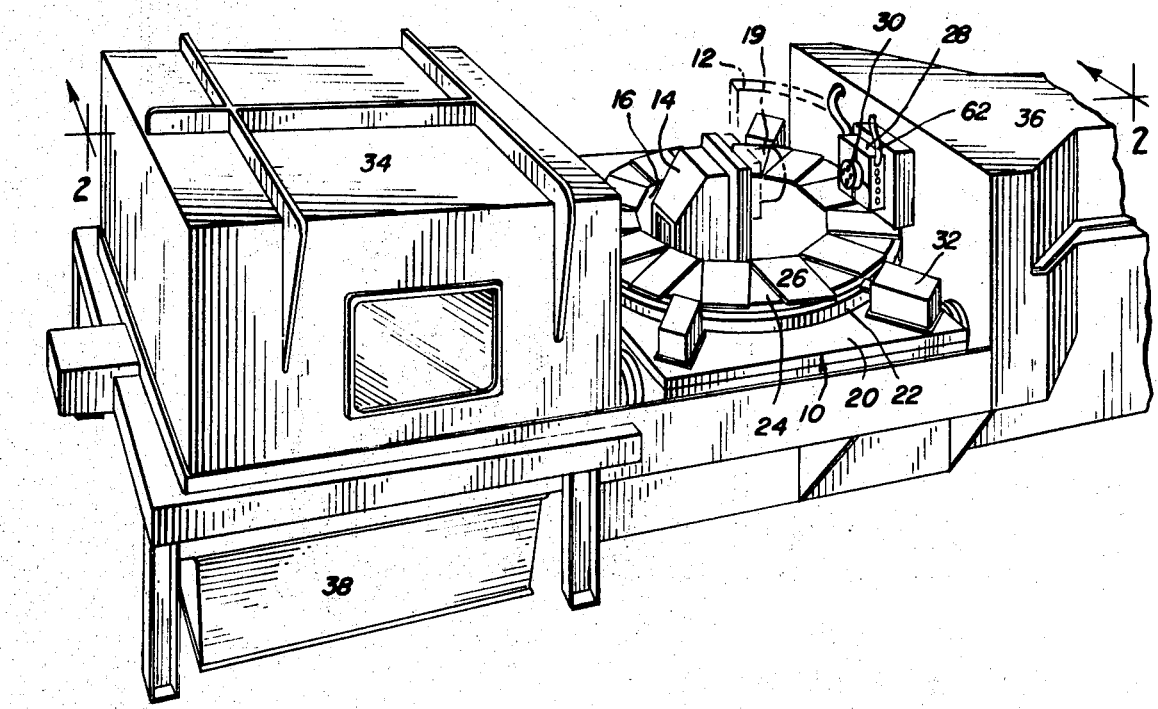
FIG. 1 is a perspective view of one embodiment of the apparatus of this invention, which includes a rotatable indexing table for supporting a workpiece in a desired angular position. The first electrode member is shown in phantom for clarity, while the second electrode member, mounted on the ram, is shown in full lines as the shaping cathode used in the apparatus.

Ramhead 28 carries, as shown in FIG. 1, shaping cathode 30, to demetallize the exterior of workpiece 12. When it is desired to demetallize the interior of workpiece 12, the shaping cathode 30 is mounted instead on tooling post 14 and the backing electrode 19 is mounted on ramhead 28.

Shot pins or toggle clamps 32 prevent ring 24 from rotating while the electrolytic shaping process takes place. Cover 34 slides on rails to enclose table 10, workpiece 12, and tooling post 14 during the electrochemical machining operation. Housing 36 encloses the drive means for laterally moving table 10 as well as the drive means for ramhead 28. Pan 38 holds expended electrolyte.

FIG. 2 gives a sectional view of the apparatus shown in FIG. 1, except that FIG. 2 shows the apparatus in operation with the shaping cathode 30 mounted on the tooling post 14, and the backing electrode 19 mounted on ramhead 28. Backing electrode 19 has copper braid 29 to facilitate direct current flow between workpiece 12 and electrode 19. Table 10 is displaced with respect to the shaping cathodes as shown in FIG. 1 to bring boss 40 on workpiece 12 into close proximity with the shaping cathode 30 for electrochemical machining.

Conduit 42 supplies pressurized electrolyte to shaping cathode 30, the electrolyte flowing from the aperture receiving the conduit 42 through the hollow shaping cathode and openings in the face of the shaping cathode to a work area 43, defined in FIG. 2 between cathode 30 and boss 40. Workpiece 12 is affixed to pads 26 by bolts 44. Pads 26 are attached to rotating ring 24, while ring 24 rests upon and is rotatable with respect to support ring 22, which, in turn, is affixed to base 20.

Conventional air lift devices can provide a cushion of air between support ring 22 and rotatable ring 24 to permit ring 24 to be easily rotated. The means for rotating ring 24 is not shown, but can consist of any conventional equipment, for example, a circular race attached to rotatable ring 24, the race having gear teeth about its circumference which engage a gear system to transmit rotational energy from a hand wheel or a motor to rotate both the race and rotating ring 24.

Similarly, a gearing system can connect such an outer race with a rotary pulse generator readout device to give a precise readout of the angular position of ring 24. The operator can turn the rotating table until the desired angular readout shows on the digital display, and then the operator can clamp the table by means of toggle clamps 32, thus precisely locating the workpiece with respect to its angular position for accurate machining.

Figure 3:
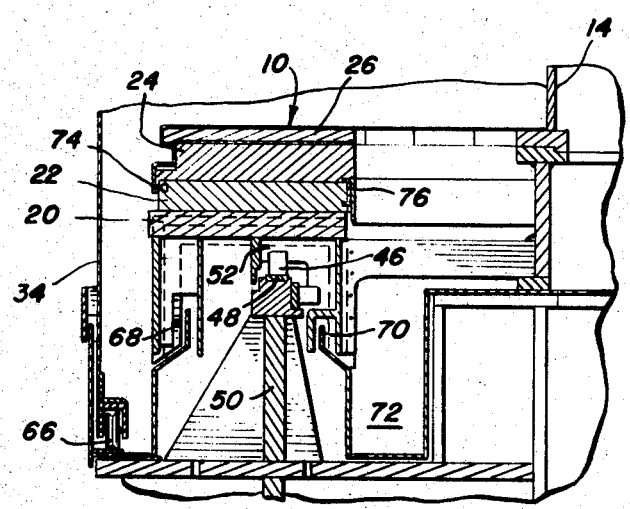
FIG. 3 is a sectional view of the apparatus of FIG. 1, taken along line 3—3 of FIG. 2, showing one side of the rotatable indexing table and the structure upon which it rests.

Base 20 is slideable in a horizontal direction, facilitated by a plurality of bearings 46 which roll on hardened ways 48, attached to wall 50, which is shown in cross-section in FIG. 3. A typical bearing which can be used consists of a loop of roller bearings which run on an ellipsoidal track, and which are affixed to the base 20 by bearing support 52.

Pressurizable piston and cylinder means in the form of an air cylinder 54 operating shaft 56 to move table 10 back and forth along hardened ways 48 is desired.

In the embodiment of FIG. 2, air cylinder 54 drives table 10 against backing electrode 19 mounted on ramhead 28 so that the buffeting acting on the electrolyte against the workpiece does not cause the workpiece to separate momentarily from the backing electrode to cause an electric arc. Such an electric arc can damage the surface of the workpiece. When the electrode members are reversed, as shown in FIG. 1, cylinder 54 can urge table 10 in the opposite direction to accomplish the same purpose.

A similar horizontal sliding mechanism is found on the other side of moving table 10, so that the table actually slides on two parallel walls 50. Boss 40, which is part of workpiece 12, is indexed by the rotary motion of table 10 into a position directly in front of shaping cathode 30. Then the horizontal motion of ramhead 28 and table 10 brings boss 40 into close proximity with shaping cathode 30 during the electrochemical machining process.

Ramhead 28 is conventionally advanced by the action of motor M, chain 45 and sprockets 47 and 49 which rotate drive screw 51. Drive screw 51 coacts with ball nut 53 to advance ram 55, which is carried by a system of bearings and hardened ways 57. Ramhead 28 is carried by ram 55, being separated therefrom by insulating block 59.

Direct electric current is passed between cathode 30 and the backing electrode 19, traveling across workpiece 12 and the stream of electrolyte in work area 43 in a sense to make the workpiece 12 anodic, the current being provided by cables 60 and 62, which lead to a direct current source. Cables 60 are electrically connected to conductive member 14 M, which electrically connects electrode 30 with cables 60.

Bearings 46 and hardened way 48 are protected from contact with the electrolyte, to prevent corrosion, by extensible boots 64 which expand and contract in accommodation to the lateral position of table 10. Other boots 65 and 64 protect ram 55 and piston rod 56.

Pads 26 generally carry a thin coating of electrically insulating, noncorrodible material, such as epoxy resin filled with fibrous glass, on all of their exposed faces to prevent corrosion in the presence of the liquid electrolyte. This coating is also carried on the exposed portions of ring 24. The upper surfaces of the various pads 26 occupy a single plane so that the workpiece is level when attached to the pads.

The workpiece can be raised or lowered on the table 10 by using pads 26 of varying thickness, or, if desired, the electrode members can be raised or lowered on tooling post 14 and ramhead 28, to machine areas on the workpiece at different vertical locations.

FIG. 3 is taken along line 3—3 in FIG. 2, and shows a cross section of one side of the moving table 10. FIG. 3 particularly illustrates the means for effecting horizontal motion of the table. As was shown in FIG. 2, pads 26 are affixed to rotating ring 24, which in turn rests upon support ring 22. Support ring 22 is attached to base 20, which is attached to bearing support 52 for holding bearings 46 which move along hardened ways 48. The hardened ways are carried by supporting wall 50.

Cover 34 rolls in a horizontal direction on roller and track assembly 66 from the opened position shown in FIG. 1 to a closed position over the tooling post 14 and moving table 10 of this apparatus.

Labyrinths 68 and 70, which have generally vertical walls, prevent electrolyte from penetrating into the region occupied by bearings 46 and hardened ways 48, where the electrolyte would cause corrosion. At the same time, labyrinths 68 and 70 permit the table 10 to slide with respect to wall 50 and tooling post 14. Channel 72 collects electrolyte which has passed between the workpiece and the shaping cathode, the channel leading into electrolyte collection pan 38 (shown in FIG. 1) to carry expended electrolyte away from the electrolyte shaping region of the apparatus.

Electrolyte is prevented from migrating into the space between support ring 22 and rotating ring 24 by conventional baffle assemblies 74 and 76, which commonly consist of circular walls depending downwardly from rotating ring 24 to shield the face between rings 22 and 24. If desired, the baffle assemblies 74 and 76 can also include air-expansible circular seals carried by support ring 22 which can be expanded during the electrochemical machining process to engage the inside of downwardly depending walls to form a seal therewith, and which can be contracted to permit ring 24 to rotate on the support ring without an excessive degree of friction.

It will be observed that numerous variations and modifications may be effected without departing from the true spirit and scope of the novel concept of the invention. It is, of course, intended to cover by the appended claims all such modifications as fall within the scope of the claims.

That which is claimed is:

1. An apparatus used in electrochemically machining an electrically conductive and electrochemically erodible workpiece, which comprises: a table having a work-supporting surface; means for rotating said table about an axis perpendicular to said work-supporting surface; means for moving said table in a linear direction parallel to said work-supporting surface; means for carrying a workpiece on said work-supporting surface; means for mounting a first electrically conductive member at a position adjacent said workpiece while the latter is carried on said work-supporting surface; ram means having means for mounting a second electrically conductive member, said ram means being capable of moving said second electrically conductive member generally parallel to said linear direction of motion of said table into adjacent relation with said first electrically conductive member for electrochemically machining said workpiece between said two electrically conductive members.

2. The apparatus of claim 1 in which said table defines an aperture through its work-supporting surface with said perpendicular axis of rotation of said table passing through said aperture; said means for holding a first electrically conductive member extending through said aperture.

3. The apparatus of claim 2 in which said means for holding said first electrically conductive member is a fixed post.

4. The apparatus of claim 2 in which said perpendicular axis of rotation of said table passes through the approximate center of said table.

5. The apparatus of claim 1 in which said ram means comprises a mechanically operated ram for forceably driving said second conductive member toward said first conductive member at a constant rate of advance.

6. The apparatus of claim 1 having means for passing a stream of pressurized electrolyte between one mounted electrically conductive member and said workpiece, and means for passing direct electric current between said mounted electrically conductive members and through said electrolyte stream and workpiece in a sense to make said workpiece anodic and said one conductive member cathodic.

7. The apparatus of claim 1 having means for providing pressurized liquid electrolyte to one of said electrically conductive members, said one electrically conductive member comprising a hollow electrode having at least one opening in its surface which engages said workpiece and having an aperture for receiving the pressurized electrolyte.

8. The apparatus of claim 1 in which the means for moving said table in a direction parallel to said work-supporting surface comprises pressurizeable piston and cylinder means for moving said table, and roller bearing means, movable in a track, for facilitating the motion of said table.

9. The apparatus of claim 1 in which said table is generally ring-shaped, said work-supporting surface being defined by a plurality of pads distributed about one face of said ring.

10. The apparatus of claim 1 in which enclosure means surround said apparatus to collect electrolyte and to limit the splashing thereof.

11. An apparatus used in electrochemically machining a hollow workpiece having at least one opening to the outside comprising: a table having a circular aperture therein, one face of said table carrying a plurality of pads which define a work-supporting surface; means for rotating said table about an axis running perpendicular to said work-supporting surface and through the center of said aperture; at least one piston attached to said table and operable in a cylinder to move said table back and forth along a line parallel to said work-supporting surface; means for carrying said workpiece on said work-supporting surface to generally surround said aperture with the opening in the workpiece facing the aperture; a fixed post extending through said aperture and having means for mounting a first electrically conductive member thereon in a position surrounded by said workpiece carried by said work-supporting surface; ram means having means for mounting a second electrically conductive member, said ram means comprising a ram and a drive screw cooperating with said ram to move said second electrically conductive member back and forth in a direction parallel to said line of motion of said table, and for moving said second conductive member into adjacent relation with said first electrically conductive member for electrochemically machining said workpiece between said electrically conductive members.

12. The apparatus of claim 11 having means for passing a stream of pressurized electrolyte between one mounted electrically conductive member and said workpiece, and means for passing direct electric current between said mounted electrically conductive members and through said electrolyte stream and workpiece in a sense to make said workpiece anodic and said one conductive member cathodic.

References Cited

UNITED STATES PATENTS

| | | | |
|---|---|---|---|
| 3,095,364 | 6/1963 | Faust et al. | 204—143 |
| 3,130,140 | 4/1964 | Malkowski | 204—225 |
| 3,287,245 | 11/1966 | Williams | 204—143 |
| 3,288,698 | 11/1966 | Bruns | 204—224 |

JOHN H. MACK, Primary Examiner

T. TUFARIELLO, Assistant Examiner

U.S. Cl. X.R.

204—143, 225

Dedication 3,563,876.—*Leonard R. Malkowski*, La Grange, and *Sigmund H. Bielak*, Downers Grove, Ill. ELECTROCHEMICAL MACHINING APPARATUS HAVING RAM MEANS. Patent dated Feb. 16, 1971. Dedication filed Dec. 23, 1971, by the assignee, *Anocut Engineering Company*.

Hereby dedicates to the Public the portion of the term of the patent subsequent to Dec. 24, 1971.

[*Official Gazette April 25, 1972.*]